US010708985B2

(12) United States Patent
Lu et al.

(10) Patent No.: US 10,708,985 B2
(45) Date of Patent: Jul. 7, 2020

(54) COVER BODY COMPONENT AND MICROWAVE OVEN

(71) Applicants: GUANGDONG MIDEA KITCHEN APPLIANCES MANUFACTURING CO., LTD., Foshan (CN); MIDEA GROUP CO., LTD., Foshan (CN)

(72) Inventors: Haidong Lu, Foshan (CN); Bo Liu, Foshan (CN)

(73) Assignees: GUANGDONG MIDEA KITCHEN APPLIANCES MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 379 days.

(21) Appl. No.: 15/709,316

(22) Filed: Sep. 19, 2017

(65) Prior Publication Data

US 2018/0213615 A1    Jul. 26, 2018

(30) Foreign Application Priority Data

Jan. 23, 2017   (CN) .......................... 2017 1 0051472
Jan. 23, 2017   (CN) ..................... 2017 2 0088116 U (51) Int. Cl.
    *H05B 6/64*            (2006.01)
    *H05B 6/80*            (2006.01)
    (Continued)

(52) U.S. Cl.
    CPC .......... *H05B 6/6479* (2013.01); *A47J 36/027* (2013.01); *H05B 6/6408* (2013.01)

(58) Field of Classification Search
    CPC .... A47J 36/027; H05B 6/6408; H05B 6/6479
    (Continued)

(56) References Cited

U.S. PATENT DOCUMENTS

| | | | |
|---|---|---|---|
| 5,730,045 A | 3/1998 | Delaquis et al. | |
| 7,030,346 B1 * | 4/2006 | Miao | A47J 36/027 219/682 |
| 2013/0284727 A1 * | 10/2013 | Tai | H05B 6/6479 219/731 |

FOREIGN PATENT DOCUMENTS

| | | |
|---|---|---|
| CN | 202613522 U | 12/2012 |
| CN | 202820975 U | 3/2013 |

(Continued)

OTHER PUBLICATIONS

Midea, Office Action, CN2017100514722.3, dated Jul. 3, 2018, 6 pgs. (No translation available).

(Continued)

*Primary Examiner* — Quang T Van
(74) *Attorney, Agent, or Firm* — Morgan, Lewis & Bockius LLP (57) ABSTRACT

The present application provides a cover body component, applied to a microwave oven, the cover body component including: a cover body, wherein the cover body defines a hollow cavity with one opening end; and at least one water storage portion arranged on the cover body and used for storing water, wherein a vent hole is arranged on the at least one water storage portion, and the vent hole is connected to the hollow cavity. According to the cover body component provided by the present application, the cover body component provided with the water storage portion is deployed, water is accommodated in the water storage portion, the vent hole on the water storage portion is away from a normal water level line in the water storage portion, moreover the vent hole on the water storage portion is connected to the hollow cavity of the cover body.

8 Claims, 4 Drawing Sheets

(51) Int. Cl.
*A47J 9/00* (2006.01)
*A47J 36/02* (2006.01)

(58) Field of Classification Search
USPC ....... 219/682, 674, 734, 757, 681, 731, 730,
219/732, 401; 99/448, 450, 417, 446,
99/413, 339, 340, 416; 220/231, 203.27,
220/368, 521, 203.01; 426/112, 115, 120,
426/241, 243; 206/217, 541, 543, 544
See application file for complete search history.

(56) References Cited

FOREIGN PATENT DOCUMENTS

| | | |
|---|---|---|
| CN | 104206007 A | 12/2014 |
| CN | 206572576 U | 10/2017 |
| JP | 3198726 U | 7/2015 |
| WO | WO2013/155227 A1 | 10/2013 |

OTHER PUBLICATIONS

Office Action, JP2017-156763, dated Aug. 28, 2018, 5 pgs—(No English Translation Available).

\* cited by examiner

COVER BODY COMPONENT AND MICROWAVE OVEN

RELATED APPLICATIONS

This application claims priority to Chinese Patent Application No. 201710051472.3, filed with the State Intellectual Property Office of the People's Republic of China on Jan. 23, 2017, and entitled "COVER BODY COMPONENT AND MICROWAVE OVEN", and Chinese Patent Application No. 201720088116.4, filed with the State Intellectual Property Office of the People's Republic of China on Jan. 23, 2017, and entitled "COVER BODY COMPONENT AND MICROWAVE OVEN", both of which are incorporated herein by reference in their entirety.

FIELD OF THE TECHNOLOGY

The present application relates to the technical field of kitchen appliances, and in particular to a cover body component and a microwave oven.

BACKGROUND OF THE DISCLOSURE

Microwave ovens are accepted by more and more families due to their convenience and quickness of heating and cooking food. In the related art, when food is heated in a microwave oven, the food is directly or (the food must be loaded in vessels) indirectly placed in a cavity and is evenly heated by microwaves. This microwave oven is liable to cause water loss of the food when the food is heated or reheated, resulting in that the heated food is quite dry and affecting the taste and the nutrition of the food.

SUMMARY

The present application is intended to at least solve one of the technical problems in the prior art or related art.

To this end, one objective of the present application is to provide a cover body component.

Another objective of the present application is to provide a microwave oven.

In view of this, the present application provides a cover body component, applied to a microwave oven, the cover body component including: a cover body, wherein the cover body defines a hollow cavity with one opening end; and at least one water storage portion arranged on the cover body and used for storing water, wherein a vent hole is arranged on the at least one water storage portion, and the vent hole is connected to the hollow cavity.

According to the cover body component provided by the present application, the cover body component provided with the water storage portion is deployed, water is accommodated in the water storage portion, the vent hole on the water storage portion is away from a normal water level line in the water storage portion, moreover the vent hole on the water storage portion is connected to the hollow cavity of the cover body, when the water storage portion is heated, the water in the water storage portion is heated and evaporated to become water vapor, the water vapor enters the hollow cavity of the cover body component via the vent hole, so the air humidity in the cover body is increased, and then the taste of food can be improved.

In the prior art, when food is cooked in the microwave oven or other baking cooking utensil, a lot of water of the food is lost in a heating process, so that the food becomes dry in the heating process, the taste of the food is affected, and meanwhile a lot of nutrients of the food are lost. By adoption of the cover body component provided by the present application, when the cover body component is applied to the microwave oven, the cover body component is placed over to-be-cooked food in the microwave oven, and after the cooking is started, the water storage portion is heated to convert the water therein into the water vapor, the water vapor enters the cover body via the vent hole, and as the to-be-cooked food is in the hollow cavity of the cover body, the water vapor can enter the food so as to supplement the water of the food lost in the heating process, thereby solving the problem of becoming dry after microwave heating in the prior art, ensuring the nutrition of the food, improving the taste of the food and improving the user experience.

In addition, the above-mentioned cover body component according to the present application can further have the following additional technical features:

In the above-mentioned technical solution, preferably, the at least one water storage portion is arranged at the top of the cover body and/or on a side wall of the cover body and is located in the hollow cavity; and/or the at least one water storage portion is arranged on the side wall of the cover body and is located outside the hollow cavity.

In the technical solution, in one aspect, the water storage portion is arranged at the top of the cover body and is located in the hollow cavity; in another aspect, the water storage portion is arranged on the side wall of the cover body and is located in the hollow cavity; in a further aspect, the water storage portion is arranged on the side wall of the cover body and is located outside the hollow cavity, and since the water storage portion is arranged outside the hollow cavity, the available space in the cavity is increased, and thus the volume of the cover body is increased; the water storage portion can be arranged on the cover body in any one of the manners mentioned above, the air humidity in the cover body can be increased, the application range of the cover body component is expanded, and the placement position of the water storage portion can be determined according to the size of the space where the cover body component is placed; and further, the cover body component can be provided with a plurality of water storage portions, the plurality of water storage portions can be arranged at any one of the positions mentioned above to further increase the air humidity in the cover body, and the user can also autonomously determine to set how many water storage portions on the cover body according to the weight and the volume of the to-be-cooked food, thereby meeting the personalized needs of the user.

In any one of the above-mentioned technical solutions, preferably, the at least one water storage portion is detachably arranged on the cover body.

In the technical solution, as the water storage portion is configured as a detachable structure, in one aspect, water in the water storage portion can be conveniently supplemented; in another aspect, after long-term use of the water storage portion, germs are generated easily, the water storage portion is designed as the detachable structure to be cleaned conveniently, thereby ensuring the use sanitation of the user; and in a further aspect, the user can selectively install a plurality of water storage portions, thereby expanding the application range of the cover body component and improving the user experience.

In any one of the above-mentioned technical solutions, preferably, a buckle structure is arranged on one of the at least one water storage portion and the cover body, and a slot structure cooperatively installed with the buckle structure is arranged on the other of the at least one water storage portion and the cover body.

In the technical solution, the water storage portion and the cover body are connected by using the buckle structure and the slot structure, so the structure is simple and the operation is convenient; as a certain amount of water is accommodated in the water storage portion, and the vent hole is arranged on the water storage portion, by means of the buckle and slot connection structure, the installation is convenient and simple, overflow of the water in the water storage portion is avoided, and the user experience is improved.

In any one of the above-mentioned technical solutions, preferably, when the at least one water storage portion is located outside the hollow cavity, a through hole is arranged on the side wall of the cover body, and the vent hole is connected to the through hole.

In the technical solution, when the water storage portion is arranged outside the hollow cavity, the through hole is arranged on the side wall where the water storage portion is installed, the size of the through hole is adaptive to that of the vent hole, and the vent hole is connected to the through hole, therefore when the water in the water storage portion is heated and evaporated to become the water vapor, the water vapor enters the hollow cavity via the vent hole and the through hole. Further, a convex post can be arranged on the cover body, the through hole runs through the post, when the water storage portion and the cover body are installed, the post is inserted in the water storage portion via the vent hole, and the water vapor enters the hollow cavity from the through hole, thereby guaranteeing the sealing property of the connection between the vent hole of the water storage portion and the through hole of the cover body, and avoiding water loss.

In any one of the above-mentioned technical solutions, preferably, a water injection hole is arranged on the at least one water storage portion, and a first seal cover is arranged on the water injection hole.

In the technical solution, the water injection hole is arranged on the water storage portion for injecting water, the water injection hole is sealed by the first seal cover so as to ensure the sealing property of the space of the water storage portion and avoid water loss, and particularly when the water storage portion is located outside the hollow cavity, the loss of the water vapor via the water injection hole is avoided; and further, when the water storage portion is located in the hollow cavity, the vent hole can be used as the water injection hole, and when the water in the water storage portion is insufficient, after the water storage portion is detached, water is injected into the water storage portion via the vent hole, thereby simplifying the structure of the water storage portion, reducing processing steps, and improving the production efficiency.

In any one of the above-mentioned technical solutions, preferably, when the at least one water storage portion is arranged at the top of the cover body and/or on the side wall of the cover body and is located in the hollow cavity, the at least one water storage portion further comprises: a water storage groove arranged on the cover body, wherein the water storage groove is recessed toward one side of the hollow cavity; and a second seal cover configured to cover an opening of the water storage groove, wherein the vent hole is arranged on the side wall of the water storage groove and is close to the opening of the water storage groove.

In the technical solution, when the water storage portion is arranged at the top of the cover body or on its side wall, the water storage portion includes the water storage groove recessed towards the interior of the hollow cavity, the seal cover is arranged at the opening of the water storage groove for sealing the water storage groove so as to avoid the loss of water via the opening of the water storage groove after being heated; and since the vent hole is arranged on the side wall close to the opening of the water storage groove, the volume for accommodating the water of the water storage groove is increased, and the overflow of the water via the vent hole is avoided.

In any one of the above-mentioned technical solutions, preferably, a buckle structure is arranged on one of the second seal cover and the side wall of the water storage groove, and a slot structure cooperatively installed with the buckle structure is arranged on the other of the second seal cover and the side wall of the water storage groove.

In the technical solution, an assembly operation is accomplished by the cooperation of the buckle structure and the slot structure. The cooperation structure is simple and feasible and is convenient to process, and the subsequent detachment and maintenance are facilitated.

In any one of the above-mentioned technical solutions, preferably, an internal thread structure is arranged on the side wall of the opening of the water storage groove, and an external thread structure cooperatively installed with the internal thread structure is arranged circumferentially on the seal cover.

In the technical solution, the assembly is accomplished by the cooperation of threads, the connection is simple and compact in structure, beautiful and elegant, and is convenient to detach and install. Meanwhile, the threaded connection has sealing property and self-locking property, thereby improving the sealing property and the stability of the junction of the water storage groove and the seal cover.

In any one of the above-mentioned technical solutions, preferably, a handle structure is arranged on both of the first seal cover and the second seal cover.

In the technical solution, as the handle structure is arranged on the seal covers, the user can conveniently detach and install the seal covers by using the handle structures.

In any one of the above-mentioned technical solutions, preferably, the water storage groove is a stepped water storage groove, and the stepped water storage groove includes a first stepped groove and a second stepped groove connected to the first stepped groove; wherein the first stepped groove is located at the opening of the water storage groove, and the radial distance of the first stepped groove is greater than that of the second stepped groove.

In the technical solution, the water storage groove is set as the stepped water storage groove, wherein the second stepped groove is located below the first stepped groove, and the second stepped groove is used for accommodating liquid; the first stepped groove is used for installing the second seal cover, a cooperation structure for installing the second seal cover can be arranged on the side wall of the first stepped groove, the processing space is increased, the production efficiency is improved, meanwhile the water storage capacity of the water storage groove and the water vapor generated within unit time are increased, and the air humidity in the cavity is increased.

In any one of the above-mentioned technical solutions, preferably, a step structure is formed at the junction of the first stepped groove and the second stepped groove, and the vent hole is arranged at the step structure.

In the technical solution, as the vent hole is arranged at the step structure, the overall area of the vent hole can be increased, the flow of the water vapor within the unit time is improved, and then the air humidity in the hollow cavity of the cover body is increased, the taste of the food is improved, and the loss of nutritional ingredients of the food is avoided.

According to another objective of the present application, the present application provides a microwave oven, including an oven cavity used for cooking food; and the cover body component in any one of the above-mentioned technical solutions, wherein the cover body component is placed over the food where the food is cooked.

According to the microwave oven provided by the present application, as the cover body component is deployed, where the food is cooked, the cover body component is placed over the to-be-cooked food in the microwave oven, and after the cooking is started, the water storage portion is heated to convert the water therein into the water vapor, the water vapor enters the cover body via the vent hole, and as the to-be-cooked food is in the hollow cavity of the cover body, the water vapor can enter the food so as to supplement the water of the food lost in the heating process, thereby solving the problem of becoming dry after microwave heating in the prior art, ensuring the nutrition of the food, improving the taste of the food and improving the user experience.

Additional aspects and advantages of the present application will become apparent from the following description, or may be learned from the practice of the present application.

BRIEF DESCRIPTION OF THE DRAWINGS

The foregoing and/or additional aspects and advantages of the present application will become apparent and readily understandable from the description of the embodiments in conjunction with the following accompanying drawings, wherein.

A corresponding relation between reference signs and components names in FIG. 1 to FIG. 10 is as follows:

microwave oven: 1; cover body component: 10; cover body: 102; water storage groove: 104; vent hole: 1042; second seal cover: 106; handle structure: 1062; buckle structure: 108; slot structure: 110; and water: 20.

DETAILED DESCRIPTION OF THE EMBODIMENTS

In order that the above-mentioned objects, features and advantages of the present application are clearer, a further detailed description of the present application will be given below in combination with accompanying drawings and embodiments. It should be noted that the embodiments and the features in the embodiments of the present application may be combined with each other without conflict.

Numerous specific details are set forth in the following description to facilitate a thorough understanding of the present application, but the present application may be implemented in other manners different from those described herein, and thus the protection scope of the present application is not limited to the specific embodiments disclosed below.

A cover body component and a microwave oven according to some embodiments of the present application will be described below with reference to FIGS. 1 to 10.

As shown in FIGS. 2 to 10, the present application provides a cover body component 10, applied to a microwave oven 1, the cover body component 10 including: a cover body 102 and at least one water storage portion, and the cover body 102 defines a hollow cavity with one opening end; and the at least one water storage portion is arranged on the cover body 102 and is used for storing water 20, wherein a vent hole 1042 is arranged on the at least one water storage portion, and the vent hole 1042 is connected to the hollow cavity.

According to the cover body component 10 provided by the present application, the cover body component 10 provided with the water storage portion is deployed, water 20 is accommodated in the water storage portion, the vent hole 1042 on the water storage portion is away from a normal water level line in the water storage portion, moreover the vent hole 1042 on the water storage portion is connected to the hollow cavity of the cover body 102, and when the water storage portion is heated, the water 20 in the water storage portion is heated and evaporated to become water vapor, the water vapor enters the hollow cavity of the cover body component 10 via the vent hole 1042, so the air humidity in the cover body 102 is increased, and then the taste of food can be improved.

In the prior art, when food is cooked in the microwave oven or other baking cooking utensil, a lot of water of the food is lost in a heating process, so that the food becomes dry in the heating process, the taste of the food is affected, and meanwhile a lot of nutrients of the food are lost. By adoption of the cover body component 10 provided by the present application, when the cover body component 10 is applied to the microwave oven 1, the cover body component 10 is placed over to-be-cooked food in the microwave oven 1, and after the cooking is started, the water storage portion is heated to convert the water 20 therein into the water vapor, the water vapor enters the cover body 102 via the vent hole 1042, and as the to-be-cooked food is in the hollow cavity of the cover body 102, the water vapor can enter the food so as to supplement the water of the food lost in the heating process, thereby solving the problem of becoming dry after microwave heating in the prior art, ensuring the nutrition of the food, improving the taste of the food and improving the user experience.

In addition, the above-mentioned cover body component 10 according to the present application can further have the following additional technical features:

In an embodiment of the present application, preferably, the at least one water storage portion is arranged at the top of the cover body 102 and is located in the hollow cavity, the at least one water storage portion and the cover body 102 can be integrally formed, or the at least one water storage portion is detachably arranged at the top of the cover body 102; and further, a plurality of water storage portions can be arranged at the top of the cover body 102, and thus the air humidity in the cavity of the cover body 102 is increased.

In an embodiment of the present application, preferably, the at least one water storage portion is arranged on the side wall of the cover body 102 and is located in the hollow cavity, the at least one water storage portion can be integrally formed on the side wall of the cover body 102, or be detachably arranged on the side wall, and a plurality of water storage portions can be uniformly distributed circumferentially along the side wall of the cover body 102 so as to further increase the air humidity in the cavity of the cover body 102.

In an embodiment of the present application, preferably, the at least one water storage portion is arranged on the side wall of the cover body 102 and is located outside the hollow cavity, as the at least one water storage portion is arranged outside the hollow cavity, the available space in the cavity is increased, and thus the volume of the cover body 102 is increased.

In a specific embodiment, the at least one water storage portion can be arranged on the cover body 102 in any one of the manners mentioned above, the air humidity in the cover body 102 can be increased, the application range of the cover body component 10 is expanded, and the placement position of the at least one water storage portion can be determined according to the size of the space where the cover body component 10 is placed; and further, the cover body component 10 can be provided with a plurality of water storage portions, the plurality of water storage portions can be arranged at any one of the positions mentioned above to further increase the air humidity in the cover body 102, and the user can also autonomously determine to set how many water storage portions on the cover body 102 according to the weight and the volume of the to-be-cooked food, thereby meeting the personalized needs of the user.

In an embodiment of the present application, preferably, the at least one water storage portion is detachably arranged on the cover body 102.

In the embodiment, as the at least one water storage portion is configured as a detachable structure, in one aspect, the water in the at least one water storage portion can be conveniently supplemented; in another aspect, after long-term use of the at least one water storage portion, germs are generated easily, the at least one water storage portion is designed as the detachable structure to be cleaned conveniently, thereby ensuring the use sanitation of the user; and in a further aspect, the user can selectively install a plurality of water storage portions, thereby expanding the application range of the cover body component 10 and improving the user experience. Further, the detachable structure may be in sliding rail and groove cooperation, and may also be in a threaded connection, among other various connection ways.

In an embodiment of the present application, preferably, a buckle structure 108 is arranged on one of the at least one water storage portion and the cover body 102, and a slot structure 110 cooperatively installed with the buckle structure 108 is arranged on the other of the at least one water storage portion and the cover body.

In the embodiment, the water storage portion and the cover body 102 are connected by using the buckle structure and the slot structure, so the structure is simple and the operation is convenient; as a certain amount of water is accommodated in the water storage portion, and the vent hole 1042 is arranged on the water storage portion, by means of the connection structure of the buckle and the slot, the installation is convenient and simple, overflow of the water in the water storage portion is avoided, and the user experience is improved.

In an embodiment of the present application, preferably, when the at least one water storage portion is located outside the hollow cavity, a through hole is arranged on the side wall of the cover body 102, and the vent hole 1042 is connected to the through hole (not shown in the drawings) (In another word, the vent hole 1042 is in contact with the through hole to build a passage for water vapor).

In the embodiment, when the at least one water storage portion is arranged outside the hollow cavity, the through hole is arranged on the side wall where the at least one water storage portion is installed, the size of the through hole is adaptive to that of the vent hole 1042, and the vent hole 1042 is connected to the through hole, therefore when the water 20 in the at least one water storage portion is heated and evaporated to become the water vapor, the water vapor enters the hollow cavity via the vent hole 1042 and the through hole. Further, a convex post can be arranged on the cover body 102, the through hole runs through the post, when the at least one water storage portion and the cover body 102 are installed, the post is inserted in the at least one water storage portion via the vent hole 1042, and the water 20 enters the hollow cavity from the through hole, thereby guaranteeing the sealing property of the connection between the vent hole 1042 of the at least one water storage portion and the through hole of the cover body 102, and avoiding loss of the water.

In an embodiment of the present application, preferably, a water injection hole is arranged on the at least one water storage portion, and a first seal cover is arranged on the water injection hole.

In the embodiment, the water injection hole is arranged on the water storage portion for injecting water, the water injection hole is sealed by the first seal cover so as to ensure the sealing property of the space of the water storage portion and avoid the loss of the water, and particularly when the water storage portion is located outside the hollow cavity, the loss of the water via the water injection hole is avoided; and further, when the at least one water storage portion is located in the hollow cavity, the vent hole 1042 can be used as the water injection hole, and when the water in the at least one water storage portion is insufficient, after the at least one water storage portion is detached, water is injected into the at least one water storage portion via the vent hole 1042, thereby simplifying the structure of the at least one water storage portion, reducing processing steps, and improving the production efficiency.

In an embodiment of the present application, preferably, as shown in FIGS. 2 to 6, when the at least one water storage portion is arranged at the top of the cover body 102 and/or on the side wall of the cover body 102 and is located in the hollow cavity, the at least one water storage portion further comprises: a water storage groove 104 arranged on the cover body 102, wherein the water storage groove 104 is recessed toward one side of the hollow cavity; and a second seal cover 106 configured to cover the opening of the water storage groove 104, wherein the vent hole 1042 is arranged on the side wall of the water storage groove 104 and is close to the opening of the water storage groove 104.

In the embodiment, when the at least one water storage portion is arranged at the top or on the side wall of the cover body 102, the at least one water storage portion includes the water storage groove 104 recessed towards the interior of the hollow cavity, the seal cover is arranged at the opening of the water storage groove 104 for sealing the water storage groove 104 so as to avoid the loss of the water 20 via the opening of the water storage groove 104 after being heated; and since the vent hole 1042 is arranged on the side wall close to the opening of the water storage groove 104, the volume for accommodating the water of the water storage groove 104 is increased, and the overflow of the water 20 via the vent hole 1042 is avoided.

In an embodiment of the present application, preferably, as shown in FIGS. 6 to 10, a buckle structure 108 is arranged on one of the second seal cover 106 and the side wall of the water storage groove 104, and a slot structure 110 cooperatively installed with the buckle structure 108 is arranged on the other of the second seal cover and the side wall of the water storage groove.

In the embodiment, an assembly operation is accomplished by the cooperation of the buckle structure 108 and the slot structure 110. The cooperation structure is simple and feasible and is convenient to process, and the subsequent detachment and maintenance are facilitated.

In an embodiment of the present application, preferably, an internal thread structure is arranged on the side wall of the opening of the water storage groove 104, and an external thread structure cooperatively installed with the internal thread structure is arranged circumferentially on the seal cover.

In the embodiment, the assembly is accomplished by the cooperation of threads, the connection is simple and compact in structure, beautiful and elegant, and is convenient to detach and install. Meanwhile, the threaded connection has sealing property and self-locking property, thereby improving the sealing property and the stability of the junction of the water storage groove 104 and the seal cover. Further, the connection mode of the second seal cover 106 and the water storage groove 104 is not limited to the several modes listed herein, but can also in a plug-pull mode or a snap mode, etc.

In an embodiment of the present application, preferably, handle structures 1062 are arranged on both of the first seal cover and the second seal cover.

In the embodiment, as shown in FIGS. 7 to 10, as the handle structures 1062 are arranged on the seal covers, the user can conveniently detach and install the seal covers by using the handle structures 1062, therefore the user operation is facilitated, and the structure is simple.

In an embodiment of the present application, preferably, as shown in FIGS. 2 to 6, the water storage groove 104 is a stepped water storage groove 104, and the stepped water storage groove 104 includes a first stepped groove and a second stepped groove connected to the first stepped groove; wherein the first stepped groove is located at the opening of the water storage groove 104, and the radial distance of the first stepped groove is greater than that of the second stepped groove.

In the embodiment, the water storage groove 104 is set as the stepped water storage groove 104, wherein the second stepped groove is located below the first stepped groove, and the second stepped groove is used for accommodating liquid; the first stepped groove is used for installing the second seal cover 106, a cooperation structure for installing the second seal cover 106 can be arranged on the side wall of the first stepped groove, the processing space is increased, the production efficiency is improved, meanwhile the water storage capacity of the water storage groove 104 and the water generated within unit time are increased, and the air humidity in the cavity is increased.

Figure 2:
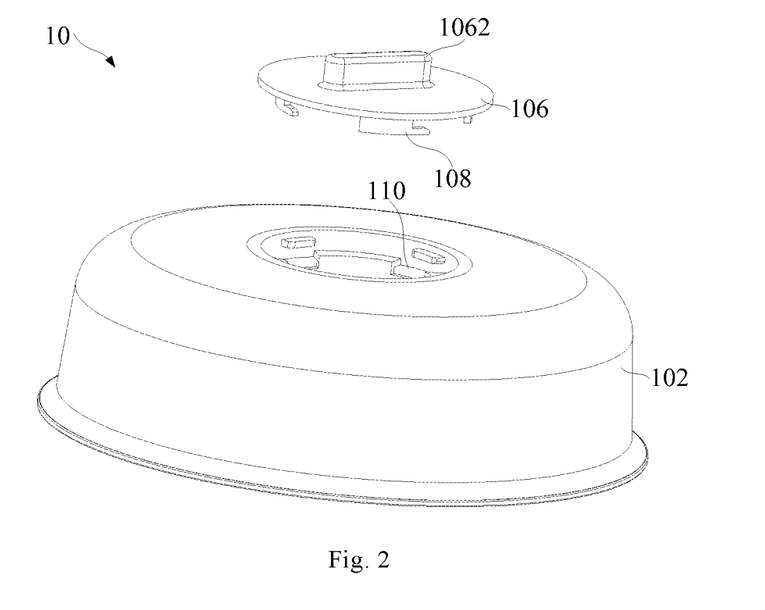
FIG. 2 is an exploded view of a cover body component in an embodiment of the present application.
Figure 3:
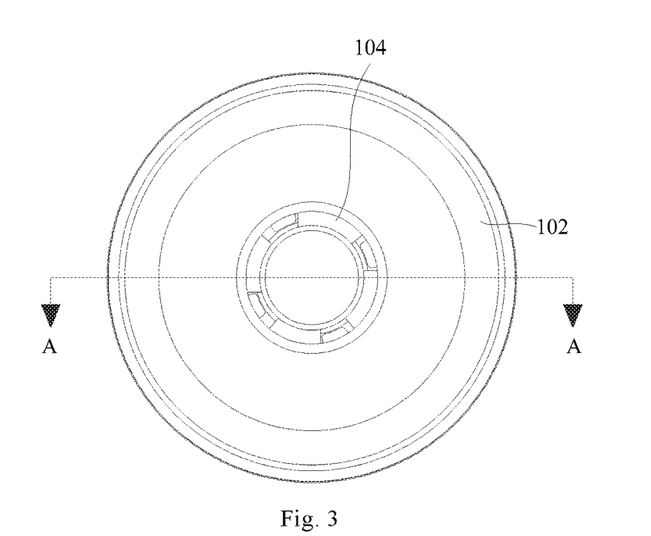
FIG. 3 is a front view of a cover body and a water storage groove in an embodiment of the present application.
Figure 4:
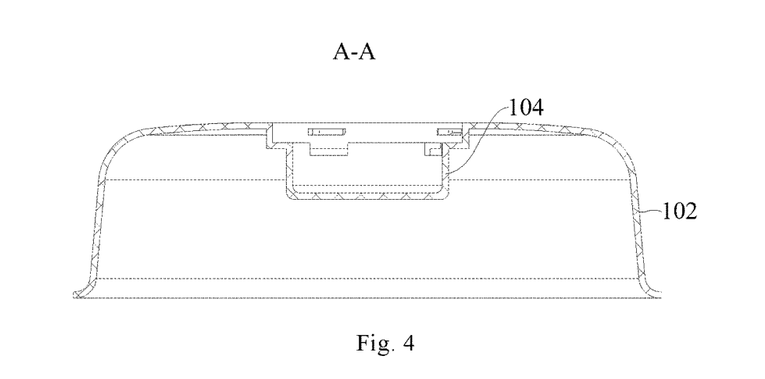
FIG. 4 is a sectional view of the cover body and the water storage groove in the embodiment as shown in FIG. 3 along A-A.
Figure 5:
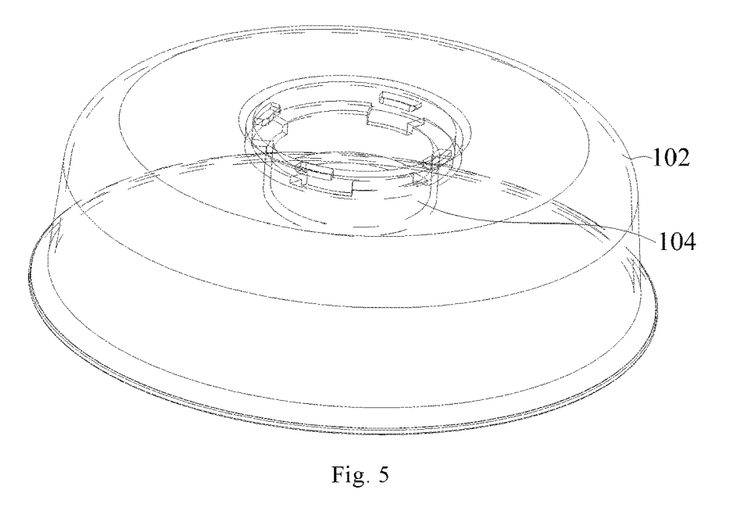
FIG. 5 is an exploded view of a cover body and a water storage groove in an embodiment of the present application.
Figure 6:
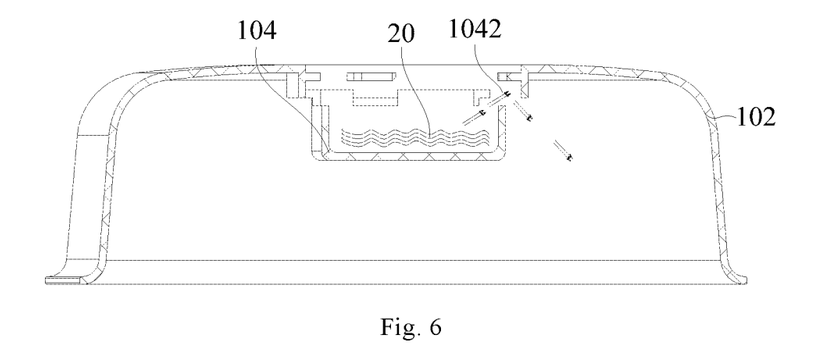
FIG. 6 is a sectional view of the cover body and the water storage groove in the embodiment as shown in FIG. 5.
Figure 7:
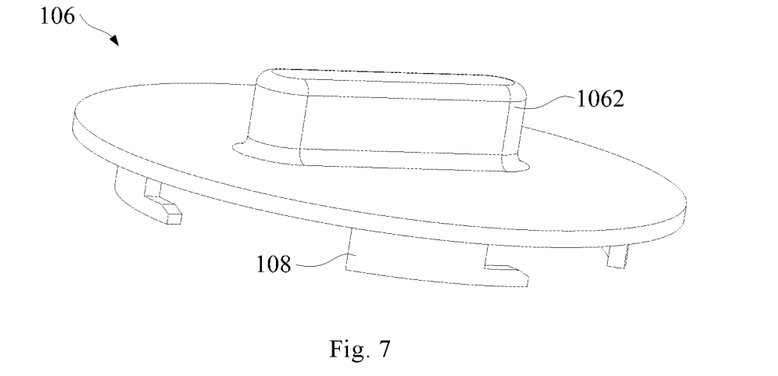
FIG. 7 is a structural schematic diagram of a seal cover in an embodiment of the present application.
Figure 8:
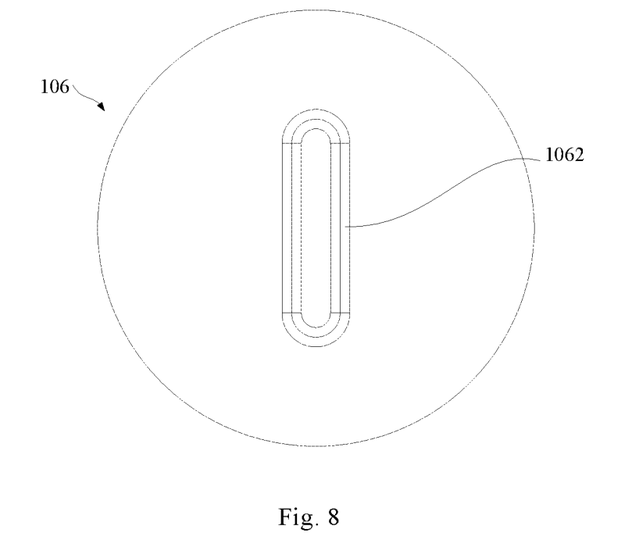
FIG. 8 is a front view of a seal cover in an embodiment of the present application.
Figure 9:
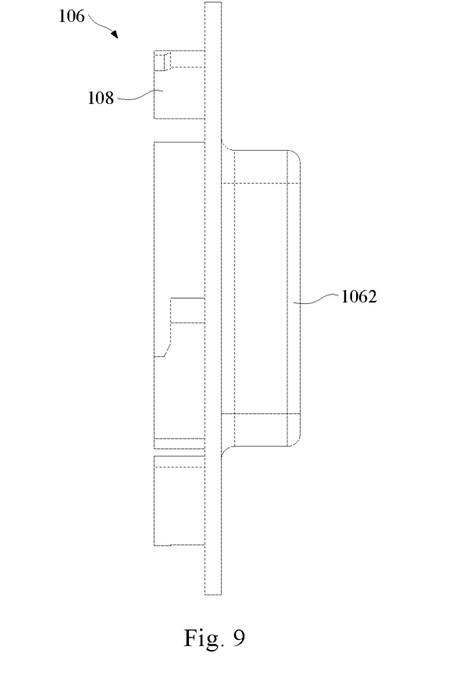
FIG. 9 is a left view of the seal cover in the embodiment as shown in FIG. 8.

In an embodiment of the present application, preferably, as shown in FIGS. 2 and 6, a step structure is formed at the junction of the first stepped groove and the second stepped groove, and the vent hole 1042 is arranged at the step structure.

In the embodiment, as the vent hole 1042 is arranged at the step structure, the overall area of the vent hole 1042 can be increased, the flow of the water within the unit time is improved, and then the air humidity in the hollow cavity of the cover body 102 is increased, the taste of the food is improved, and the loss of nutritional ingredients of the food is avoided.

Figure 10:
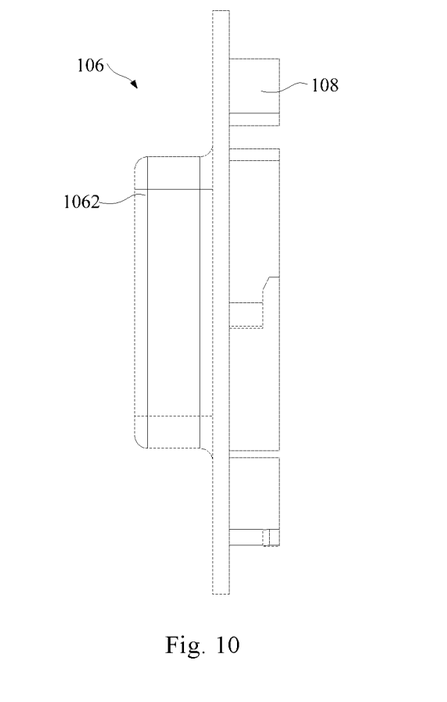
FIG. 10 is a right view of the seal cover in the embodiment as shown in FIG. 8.

In a specific embodiment, as shown in FIGS. 2 and 10, the at least one water storage portion is arranged at the top of the cover body 102, at least one water storage groove 104 recessed downward is arranged at the top of the cover body 102, the seal cover is arranged at the opening at the top of the water storage groove 104, the vent hole 1042 is arranged on the side wall of the water storage groove 104, and the vent hole 1042 is close to the opening side of the top of the water storage groove 104, thereby ensuring an enough space for accommodating the water in the water storage groove 104; the water storage groove 104 is the stepped water storage groove, the radial distance of the stepped groove close to the top end of the cover body 102 is greater than the radial distance of the stepped groove close to the inner side of the cavity, and the seal cover is arranged in the stepped groove at the upper part; the assembly structure of the seal cover and the water storage groove 104 is a buckle and a clamping position, the handle structure 1062 is arranged on the other side of the seal cover, and the seal cover is rotated by the handle structure 1062 to cover the buckle on the clamping position so as to accomplish the assembly.

Figure 1:
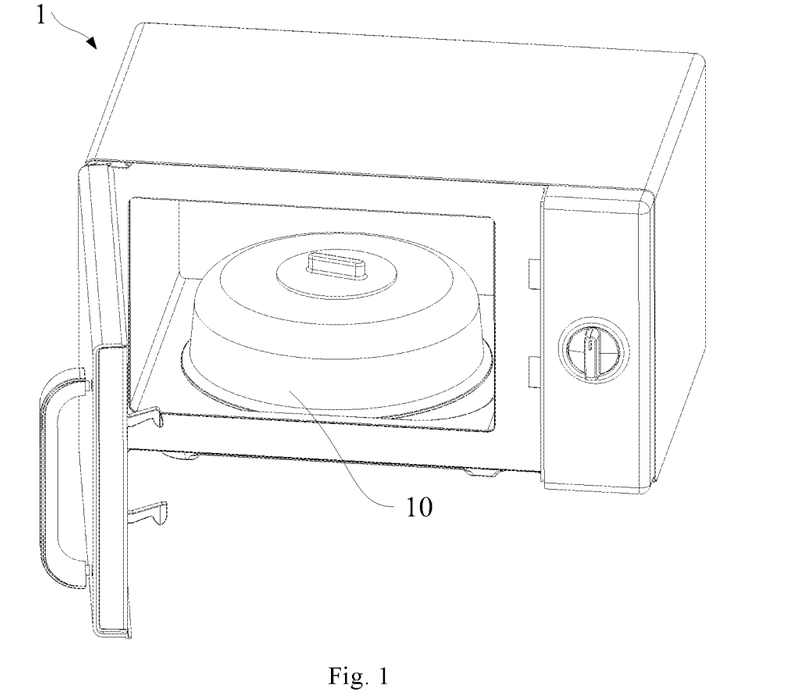
FIG. 1 is a structural schematic diagram of a microwave oven in an embodiment of the present application.

As shown in FIG. 1, another embodiment according to the present application provides a microwave oven 1, including an oven cavity used for cooking food; and the cover body component 10 in an embodiment of the present application, wherein the cover body component 10 is placed over the food where the food is cooked.

According to the microwave oven 1 provided by the present application, as the cover body component 10 is deployed, where the food is cooked, the cover body component 10 is placed over the to-be-cooked food in the microwave oven 1, and after the cooking is started, the at least one water storage portion is heated to convert the water 20 therein into the water vapor, the water vapor enters the cover body 102 via the vent hole 1042, and as the to-be-cooked food is in the hollow cavity of the cover body 102, the water vapor can enter the food so as to supplement the water of the food lost in the heating process, thereby solving the problem of becoming dry after microwave heating in the prior art, ensuring the nutrition of the food, improving the taste of the food and improving the user experience.

In the specific embodiment, when the user uses the microwave oven 1, the user firstly places the food in the cooking cavity of the microwave oven 1, opens the seal cover of the cover body component 10, injects a certain amount of water 20 in the structure of the water storage groove 104, screws down the seal cover, and place the cover body component 10 over the to-be-cooked food. After the cooking is started, the at least one water storage portion is heated to convert the water 20 therein into the water vapor, the water vapor enters the cover body 102 via the vent hole 1042, and as the to-be-cooked food is in the hollow cavity of the cover body 102, the water vapor can enter the food so as to supplement the water of the food lost in the heating process, thereby solving the problem of becoming dry after microwave heating in the prior art, ensuring the nutrition of the food, improving the taste of the food and improving the user experience.

The foregoing descriptions are merely preferred embodiments of the present application, rather than limiting the present application. For those skilled in the art, the present application may have various variations and changes. Any modifications, equivalent substitutions, improvements and the like made within the spirit and principle of the present application shall all fall within the protection scope of the present application.

What is claimed is:

1. A cover body component, applied to a microwave oven, comprising:
    a cover body, wherein the cover body defines a hollow cavity with one opening end; and
    at least one water storage portion used for storing water, arranged at a top of the cover body and located in the hollow cavity;
    wherein the at least one water storage portion further comprises:
        a water storage groove arranged on the cover body, and the water storage groove is recessed toward one side of the hollow cavity;
        a vent hole arranged on a side wall of the water storage groove, and the vent hole is close to an opening of the water storage groove and is connected to the hollow cavity; and
        a first seal cover configured to cover the opening of the water storage groove, wherein an internal thread structure is arranged on the side wall of the opening of the water storage groove, and an external thread structure cooperatively installed with the internal thread structure is arranged circumferentially on the first seal cover.

2. The cover body component of claim 1, wherein the at least one water storage portion is detachably arranged on the cover body.

3. The cover body component of claim 2, wherein a buckle structure is arranged on one of the at least one water storage portion and the cover body, and a slot structure cooperatively installed with the buckle structure is arranged on the other of the at least one water storage portion and the cover body.

4. The cover body component of claim 1, wherein a water injection hole is arranged on the at least one water storage portion, and a second seal cover is arranged on the water injection hole.

5. The cover body component of claim 4, wherein a handle structure is arranged on both the first seal cover and the second seal cover.

6. The cover body component of claim 1, wherein the water storage groove is a stepped water storage groove, and the stepped water storage groove comprises a first stepped groove and a second stepped groove connected to the first stepped groove; and
wherein the first stepped groove is located at the opening of the water storage groove, and a radial distance of the first stepped groove is greater than that of the second stepped groove.

7. The cover body component of claim 6, wherein a step structure is formed at a junction of the first stepped groove and the second stepped groove, and the vent hole is arranged at the step structure.

8. A microwave oven, comprising:
    an oven cavity used for cooking food; and
    a cover body component comprising:
        a cover body, wherein the cover body defines a hollow cavity with one opening end; and
        at least one water storage portion used for storing water, arranged at a top of the cover body and located in the hollow cavity;
        wherein the at least one water storage portion further comprises:
            a water storage groove arranged on the cover body, and the water storage groove is recessed toward on side of the hollow cavity;
            a vent hole arranged on a side wall of the water storage groove, and the vent hole is close to an opening of the water storage groove and is connected to the hollow cavity; and
            a first seal cover configured to cover the opening of the water storage groove, wherein an internal thread structure is arranged on the side wall of the opening of the water storage groove, and an external thread structure cooperatively installed with the internal thread structure is arranged circumferentially on the first seal cover; and
    wherein the cover body component is placed over the food within the oven cavity where the food is cooked.

* * * * *